(12) United States Patent
Gadhari et al.

(10) Patent No.: US 12,187,232 B2
(45) Date of Patent: Jan. 7, 2025

(54) SAFETY ARRANGEMENT FOR A VEHICLE

(71) Applicant: FAURECIA INDIA PRIVATE LIMITED, Pune (IN)

(72) Inventors: Pramod Gadhari, Wakad (IN); Vishnu Mamdyal, Pune (IN); Rohit Shingi, Pimpri (IN)

(73) Assignee: Faurecia India Private Limited, Bhosari (IN)

( * ) Notice: Subject to any disclaimer, the term of this patent is extended or adjusted under 35 U.S.C. 154(b) by 0 days.

(21) Appl. No.: 18/336,909

(22) Filed: Jun. 16, 2023

(65) Prior Publication Data

US 2024/0001857 A1 Jan. 4, 2024

(30) Foreign Application Priority Data

Jun. 29, 2022 (IN) .............................. 202221037279

(51) Int. Cl.
*B60R 7/04* (2006.01)
*B60R 21/231* (2011.01)

(52) U.S. Cl.
CPC .......... *B60R 7/04* (2013.01); *B60R 21/23138* (2013.01); *B60R 2021/23146* (2013.01)

(58) Field of Classification Search
CPC ............................ B60R 7/04; B60R 21/23138
See application file for complete search history.

(56) References Cited

U.S. PATENT DOCUMENTS

| 9,434,340 B2 * | 9/2016 | Egusa | ............... B60R 21/23138 |
| 11,007,961 B2 * | 5/2021 | Deng | ..................... B60R 21/055 |
| 2024/0059225 A1 * | 2/2024 | Tsuku | ..................... B60Q 3/50 |

FOREIGN PATENT DOCUMENTS

| DE | 102018002853 A1 * | 10/2018 | ....... B60R 21/23138 |
| DE | 102018220078 A1 * | 5/2020 | ........... B60R 21/231 |

* cited by examiner

*Primary Examiner* — Faye M Fleming
(74) *Attorney, Agent, or Firm* — Reising Ethington P.C.

(57) ABSTRACT

A safety arrangement for a vehicle interior. The safety arrangement includes a seat with an airbag configured to be deployed in the vehicle interior in case of an impact and a console box arranged adjacent/beside the seat. The console box may include a storage compartment for storing articles and a lid for closing/opening the storage compartment. The lid is moveable between a fully open position and a close position. Particularly, the lid is coupled to the console box by a hinge assembly facilitating the lid to move between the fully open position and the closed position. The hinge assembly biases the lid in a first position to prevent the lid from overlapping a deployment path of the airbag.

20 Claims, 9 Drawing Sheets

SAFETY ARRANGEMENT FOR A VEHICLE

TECHNICAL FIELD

The present disclosure relates to the field of a safety arrangement for a vehicle. More particularly, the present disclosure relates to a safety arrangement for proper deployment of an airbag arranged on a vehicle seat placed adjacent/beside a console box.

BACKGROUND

Airbags mostly come as a standard equipment inside the vehicle. The airbag is a safety device which operates in an emergency such as a vehicle collision or vehicle impact and protects an occupant by deploying the airbag cushion (with a fluid/gas pressure in the airbag) towards the occupant and preventing any injury to the occupant.

Air bags are installed in various positions. For example, a front airbag is provided at a centre of a steering wheel so that a driver can be protected from a collision from the forward and backward directions. In addition, in order to protect an occupant from an impact in a vehicle width direction such as a side collision, a side airbag is provided at a side part of a seat arranged adjacent/beside a console box to protect the occupants. During a collision or on an impact in a lateral/transverse direction of the vehicle, the side airbag deploys between the vehicle seat and the (centre) console box.

When the airbag is deployed in case of a vehicle impact, the lid may restrict the proper deployment of the airbag if the lid overlaps with the deployment path of the air bag, which is not desirable.

Therefore, there is a need to overcome the above drawback(s) and provide a safety arrangement for the vehicle.

SUMMARY

Some of the objectives of the present disclosure, which at least one embodiment herein satisfies, are listed herein below.

It is an object of the present disclosure to provide a safety arrangement for the vehicle which allows a side airbag of a vehicle seat to deploy without getting hindered by a lid of a console box arranged adjacent/beside the vehicle seat.

It is an object of the present disclosure to provide a safety arrangement for the vehicle which prevents injury to an occupant in case of an impact.

It is an object of the present disclosure to provide a safety arrangement for the vehicle which is simple in design and construction.

It is an object of the present disclosure to provide a safety arrangement for the vehicle which is economical and robust in construction.

Embodiments of a safety arrangement for a vehicle interior may have one or more seats with an airbag configured to be deployed in the vehicle interior in case of an impact, especially when the impact is on a side portion of the vehicle. More particularly, the airbag is deployed in a transverse and/or longitudinal direction of the vehicle interior.

Further, the safety arrangement may include a console box arranged adjacent/beside the seat. The console box may have a storage compartment with an opening for storing articles therein/thereon and a lid for closing/opening the storage compartment opening. The lid is coupled to the console box. Specifically, the lid may be hingeably or pivotally coupled to the console box. The lid may be moveable between a fully open position and a closed position. The open position(s) may allow access to the storage compartment, and an occupant can dispose or place an article within the storage compartment. In the closed position, the lid closes the opening of the storage compartment. The lid may be adapted to latch with the console box in the closed position, preferably by a hook-slot system. In an embodiment, a knob is arranged on/in the console box or lid for latching/unlatching the lid with/from the console box.

The lid may be coupled to the console box by a hinge assembly. The hinge assembly may facilitate movement of the lid between the fully open position and the closed position. The hinge assembly may bias the lid in a first position to prevent the lid from overlapping a deployment path of the airbag when the airbag is deployed in the vehicle interior. Particularly, upon an impact being applied on the vehicle, the airbag of the vehicle seat is deployed in the vehicle interior, particularly along the transverse and/or longitudinal axis of the vehicle. In one aspect, the first position is an intermediate position between the fully open position and the closed position. Specifically, the intermediate position may be a partially open position with less than 15 degrees of an opening angle ($\theta$) of the lid with respect to the closed position of the lid. In another aspect, the first position is the closed position (itself).

In one aspect, the first position is the closed position where the lid is latched with the console box. In another aspect, the first position is the closed position where the lid is unlatched with the console box.

The lid may include a first hinge plate and a second hinge plate. The lid is moveably connected to the console box via the first hinge plate. The second hinge plate is a fixed hinge plate which is attached to a portion of a body of the console box. The first hinge plate can be covered by a cushion which provides a cushioning effect such that an upper portion of the lid can be used as an armrest for the occupant. The first hinge plate and the second hinge plate are connected by a shaft. The hinge assembly is arranged between the first hinge plate and the second hinge plate, specifically on the shaft. The shaft is connected across a portion of the console box. In an embodiment, a stopper is arranged on each end of the shaft to secure the hinge plates across the shaft.

In an aspect, the hinge assembly includes a first biasing member and a second biasing member. The first biasing member is adapted for biasing the lid in a direction towards the closed position and the second biasing member is adapted for biasing the lid in a direction towards the fully opening position. The first biasing member and the second biasing member are arranged around the shaft connected across a portion of the body of the console box. The relationship between biasing forces of the first and the second biasing members biases the lid to the first position to prevent overlapping of the lid with the deployment path of the airbag when the air bag is inflated from the side portion of the seat in case of an impact being applied on the vehicle.

Specifically, the lid may have a natural tendency to move towards the first position. The lid has to be moved upward manually. When the lid is moved upward, the lid may configure the fully open position of the storage compartment. The first biasing member may be adapted to push the lid in the upward direction. The second biasing member may be adapted to push the lid in a downward direction. Naturally, the bias of the second biasing member is assisted in the downward direction due to the gravitational force.

Embodiments of the first biasing member and the second biasing member are coil springs. In an embodiment, the stiffness of the second biasing member is less than the stiffness of the first biasing member, preferably by adjusting the characterized feature(s) of the springs like any one or combination of diameter, length, number of coils, material of the spring, etc. The coil helix of both the biasing members may be arranged opposite to each other thus one is assisting the lid in the direction towards the closed position and the other in the direction towards the fully open position.

BRIEF DESCRIPTION OF THE DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

The following is a detailed description of embodiments of the disclosure depicted in the accompanying drawings. The disclosed embodiments are merely exemplary and may be embodied in various forms. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments. It will be apparent to one skilled in the art that embodiments may be practiced without some of these specific details.

The present disclosure relates to a safety arrangement for a vehicle interior which allows a side airbag of a vehicle seat to deploy in case of an impact without getting hindered by a lid of a console box arranged adjacent/beside of the seat.

Figure 1:
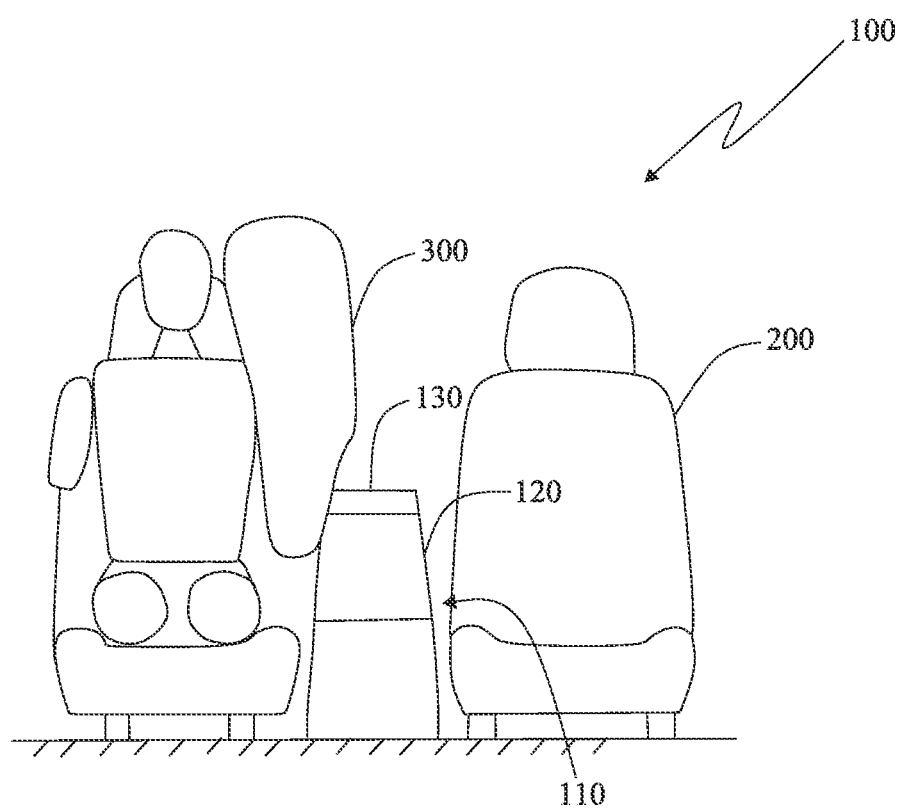
FIG. 1 illustrates an exemplary view of a proposed safety arrangement for a vehicle in accordance with an embodiment.

Referring now to FIG. 1, a safety arrangement (100) for a vehicle interior is illustrated. The safety arrangement (100) includes one or more seats (200) with an airbag (300) configured to be deployed in the vehicle interior, in case of an impact, and a console box (110) with a lid (130) arranged adjacent/beside the one or more seats (200). The air bag (300) is arranged on a side part of the one or more seats (200) beside the console box (110). Particularly, the airbag (300) is deployed in a transverse and/or longitudinal direction of the vehicle interior.

Figure 7:
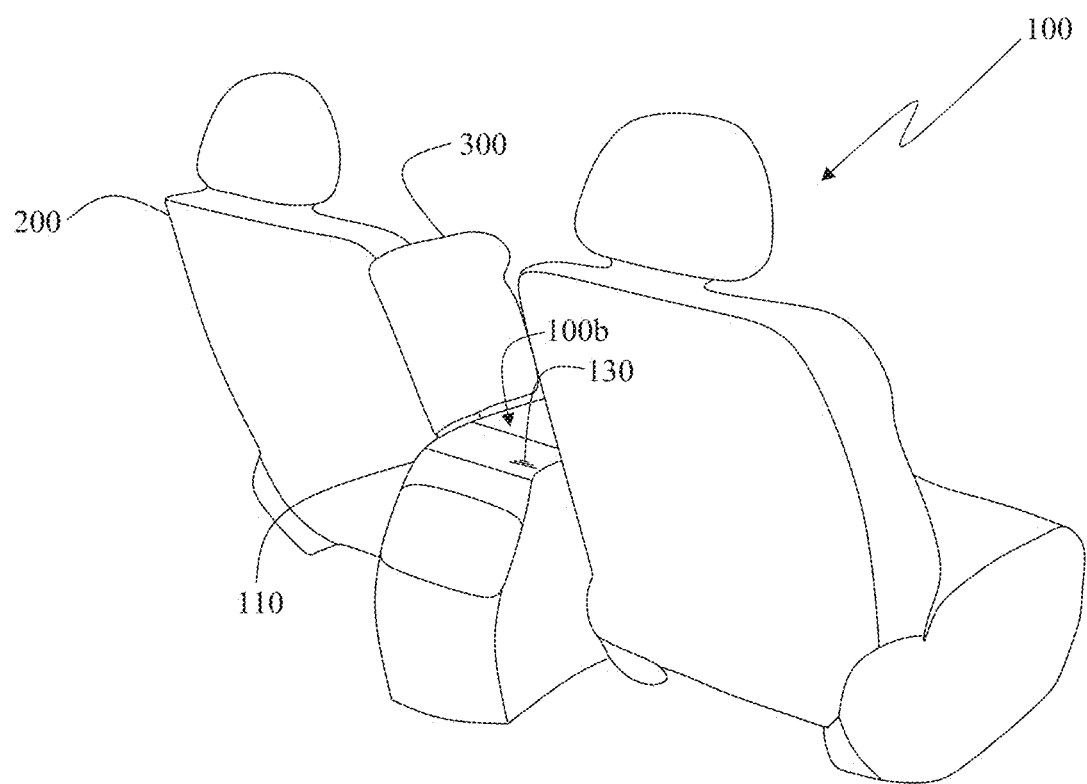
FIG. 7 illustrates an exemplary view of the safety arrangement when the lid is in a first position, wherein the first position is the closed position of the lid unlatched/latched with the console box.
Figure 9:
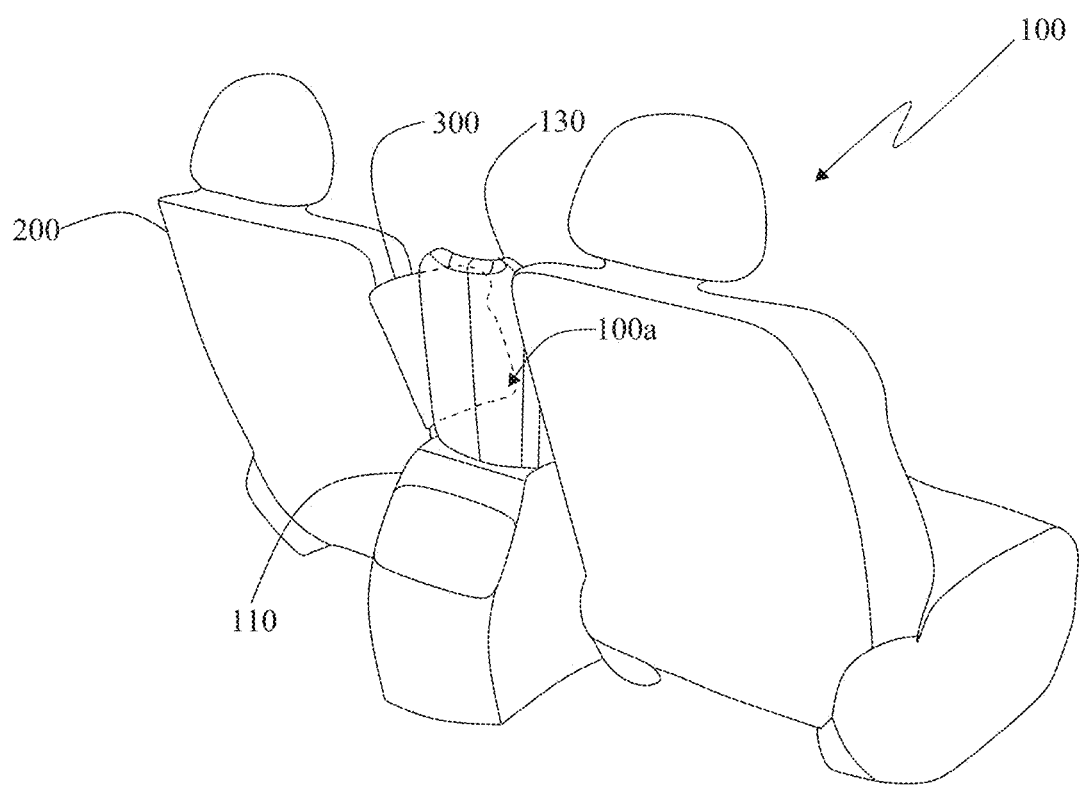
FIG. 9 illustrates an exemplary view of an armrest assembly when the airbag is deployed when the lid is in a fully open position.

The console box (110) has a storage compartment (120) for storing articles and the lid (130) for closing an opening of the storage compartment (120). The lid (130) is coupled to the console box (110), specifically hingeably or pivotally coupled to the console box (110). The lid (130) is moveable between a fully open position (100*a*) (FIG. 9) and a closed position (100*b*) (FIG. 7). The fully open position (100*a*) allows access to the storage compartment (120) and an occupant can dispose or place an article within the storage compartment (120) when the lid (130) is in the fully open position (100*a*). In the closed position (100*b*), the lid (130) closes the opening of the storage compartment (120). The lid (130) is adapted to latch with the console box (110) in the closed position (100*b*), preferably by a hook-slot system. In an embodiment, a knob is arranged on/in the console box (110) or lid (130) for latching/unlatching the lid (130) with/from the console box (110). In an embodiment, the lid (130) is an armrest of the console box (110).

Figure 2:
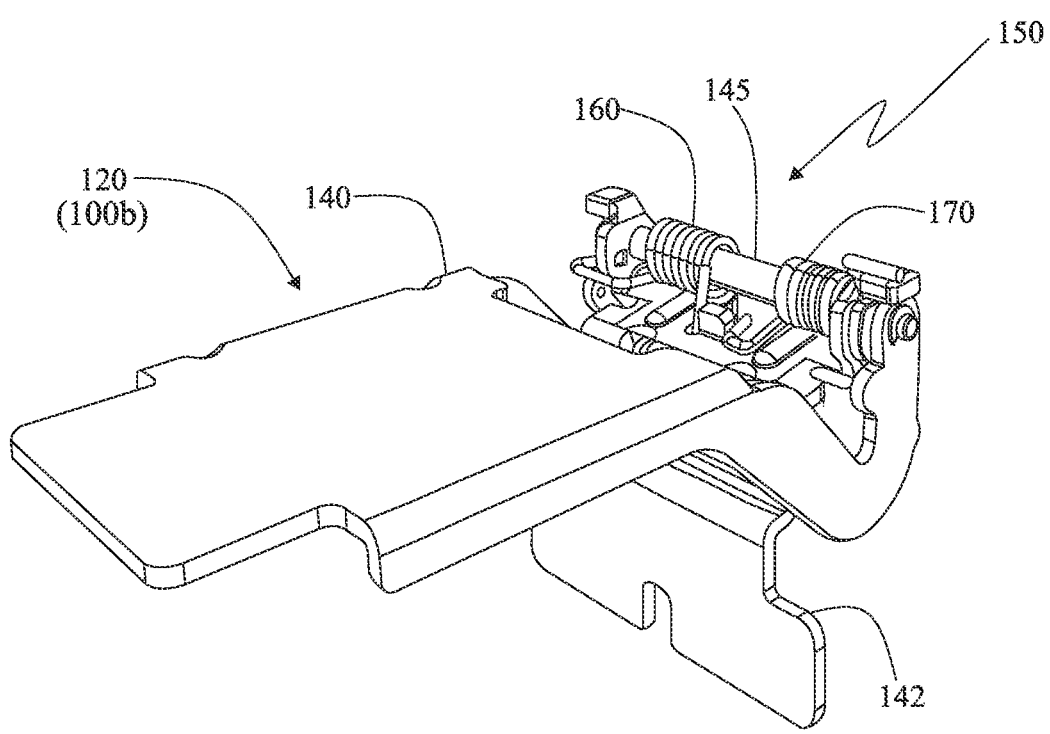
FIG. 2 illustrates an exemplary view of a lid of a console box in accordance with an embodiment.
Figure 3:
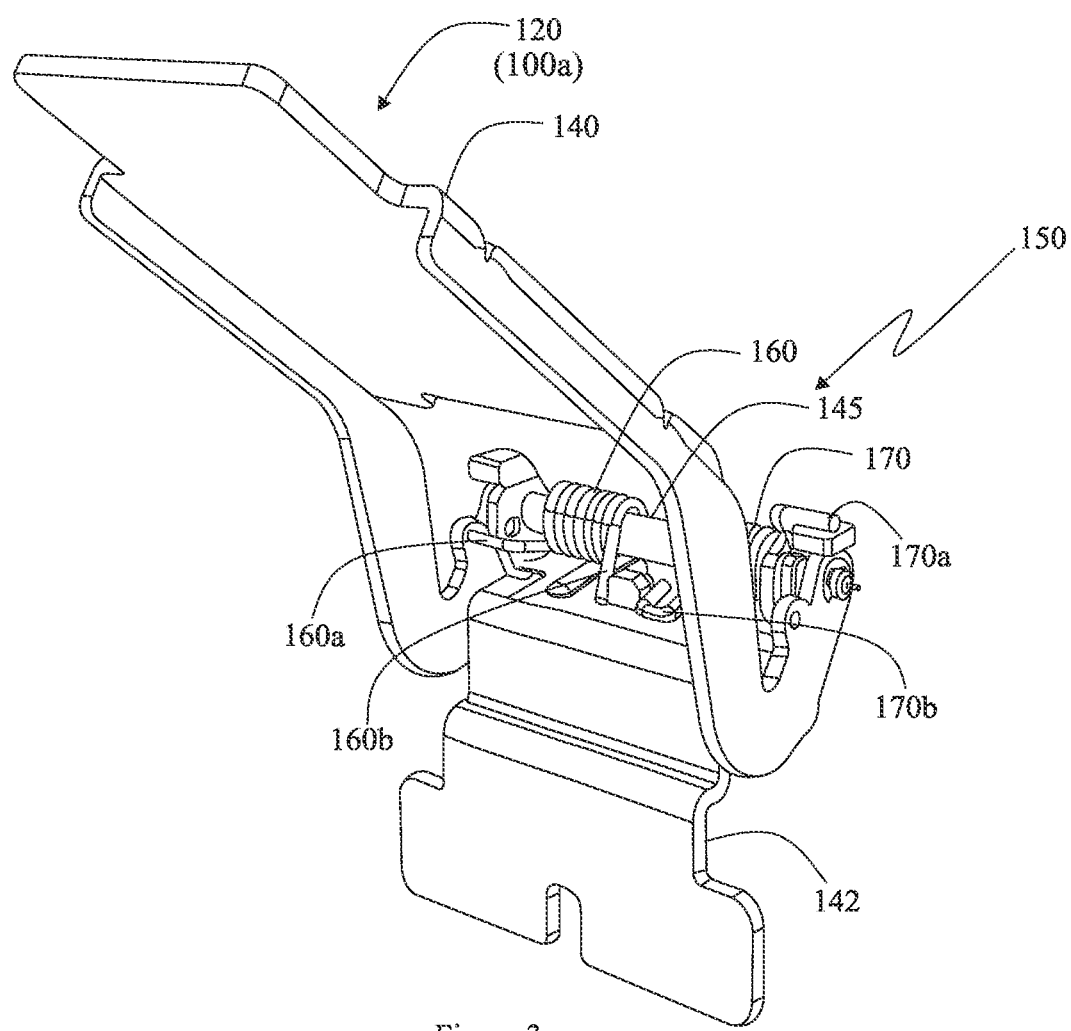
FIG. 3 illustrates an exemplary view of the lid of FIG. 2 in an open position.
Figure 4:
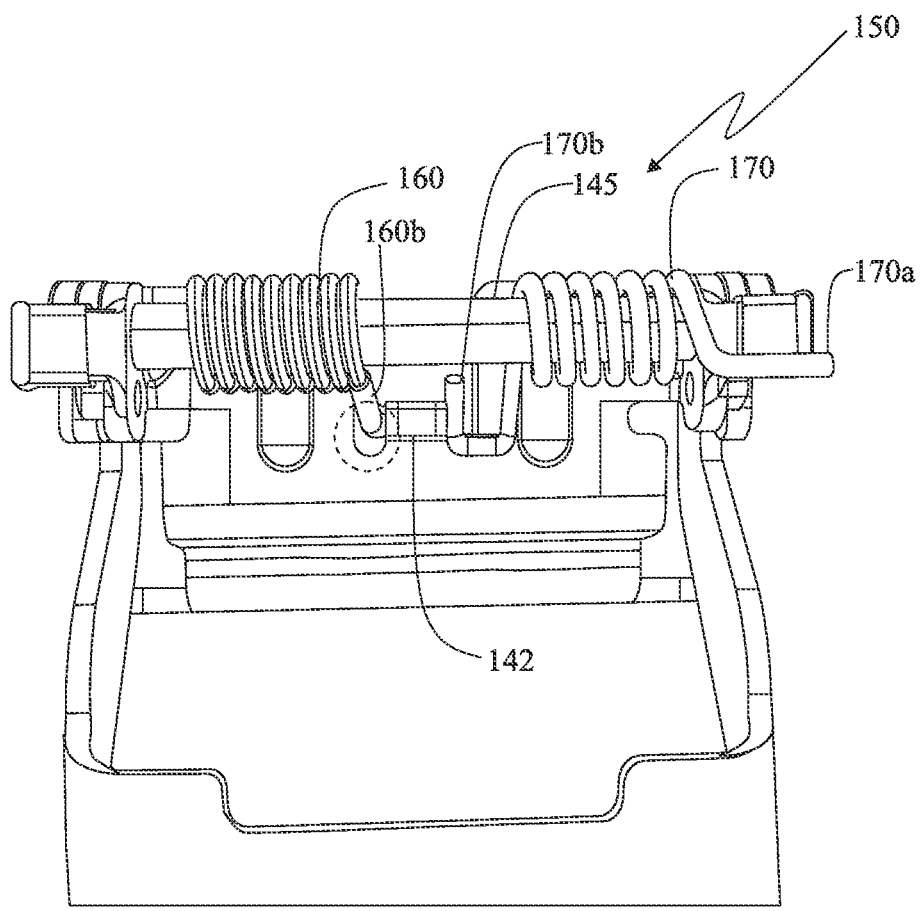
FIG. 4 illustrates an exemplary view of a hinge assembly when a first biasing member is not in contact with a second hinge plate.

Referring to FIGS. 2 and 3, the lid (130) is coupled to the console box (110) by a hinge assembly (150). The hinge assembly (150) facilitates the lid (130) to move between the fully open position (100*a*) and the closed position (100*b*). The hinge assembly (150) biases the lid (130) in a first position (100*c*) to prevent the lid (130) from overlapping a deployment path of the airbag (300).

Figure 8:
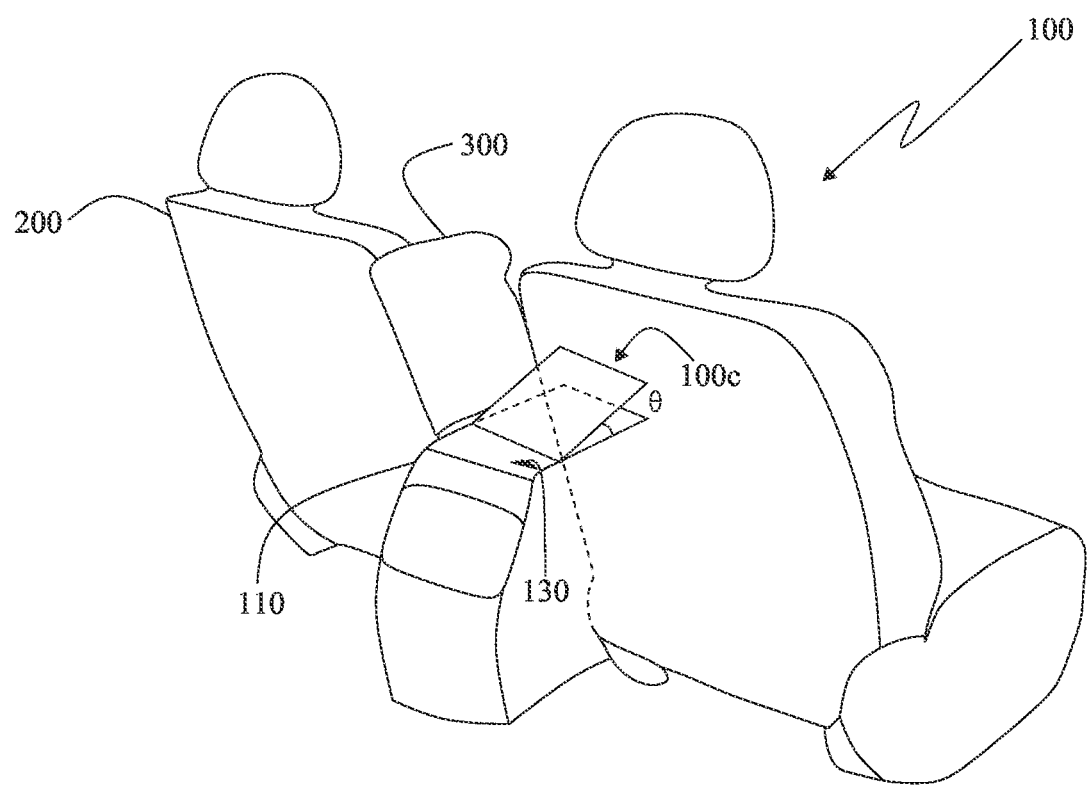
FIG. 8 illustrates an exemplary view of the safety arrangement when the lid is in a first position, wherein the first position is a partially open position that is less than 15 degrees of an opening angle (θ) of the lid with respect to the closed position of the lid.

More particularly in an embodiment (as shown in FIG. 7), the first position (100*c*) is the closed position (100*b*) (itself) where the lid (130) is latched with the console box (110). In yet another embodiment, the first position (100*c*) is the closed position (100*b*) where the lid (130) is unlatched with the console box (110). In yet another embodiment (as shown in FIG. 8), the first position (100*c*) is an intermediate position between the fully open position (100*a*) and the closed position (100*b*). Specifically, the first position (100*c*) is the intermediate position (100*c*) that is a partially open position with less than 15 degrees of an opening angle (θ) of the lid (130) with respect to the closed position (100*b*) of the lid (130).

The lid (130) includes a first hinge plate (140) and a second hinge plate (142) as shown in FIGS. 2, 3, 4, 5 and 6. The lid (130) is moveably connected to the console box (110). Specifically, the first hinge plate (140) of the lid (130) is moveably connected to the console box (110). The second hinge plate (142) is a fixed hinge plate which is attached to a portion of a body of the console box (110). The first hinge plate (140) covers the storage compartment (120) of the console box (110). The first hinge plate (140) is covered by a cushion which provides a cushioning effect such that an upper portion of the lid (130) can be used as an armrest for the occupant.

The first hinge plate (140) and the second hinge plate (142) are connected by a shaft (145). The hinge assembly (150) is arranged between the first hinge plate (140) and the second hinge plate (142) specifically on the shaft (145). The shaft (145) is connected across a portion of the console box (110). In an embodiment, a stopper (not shown) is arranged on each end of the shaft (145) to secure the hinge plates across the shaft (145).

In the present embodiment, the hinge assembly (150) includes a first biasing member (160) and a second biasing member (170) as shown in FIGS. 2, 3, 4 and 5. The first biasing member (160) is adapted for biasing the lid (130) in a direction towards the closed position (100b) and the second biasing member (170) is adapted for biasing the lid (130) in a direction towards the fully open position (100a). The first biasing member (160) and the second biasing member (170) are arranged around the shaft (145) connected across a portion of the console box (110). The relationship between biasing forces of the first biasing member (160) and the second biasing members (170) biases the lid (130) to the first position (100c) to prevent overlapping of the lid (130) with the deployment path of the airbag (300) when the air bag (300) is inflated from the side portion of the seat (200).

Specifically, the lid (130) has a natural tendency to move towards the first position (100c). The lid (130) must be moved upward manually by the occupant.

The first biasing member (160) and the second biasing members (170) are coil springs in the present embodiment, and the stiffness of the second biasing member (170) is less than the stiffness of the first biasing member (160), preferably by adjusting the characterized feature(s) of the springs, like any one or combination of diameter, length, number of coil, material of the spring, etc. By way of non-limiting example, the change in ratio of the diameters between the first and the second biasing member is almost 20%. A person skilled in the art will understand how to increase or decrease the stiffness of the biasing members to increase the effectiveness of the hinge assembly (150). The second biasing member (170) has gravity assistance, and the first biasing member (160) acts against gravity. The coil helix of both the biasing members (160, 170) are opposite to each other.

Further, in the closing direction, the lid (130) moves slowly so that the closing of the lid (130) does not cause any injury to the occupant if his/her hand or finger gets trapped in between the storage compartment (120) and the lid (130).

In an implementation, when the occupant desires to store some articles in the console box (110), he/she has to move the lid from the closed position to the open position manually, like by hand. However, upon releasing his/her hand from the lid (130), the lid (130) moves to the first position (100c) due to the hinge assembly (150). The first biasing member (160) provides force for closing the lid (130) from the maximum open position (~95°) towards the closed (0°) position. The second biasing member (170) absorbs the force generated by the first biasing member (160) and reduces the speed of the lid (130) while closing the lid (130) (e.g., from 60° to 0°) and thus provides a damping effect.

Figure 5:
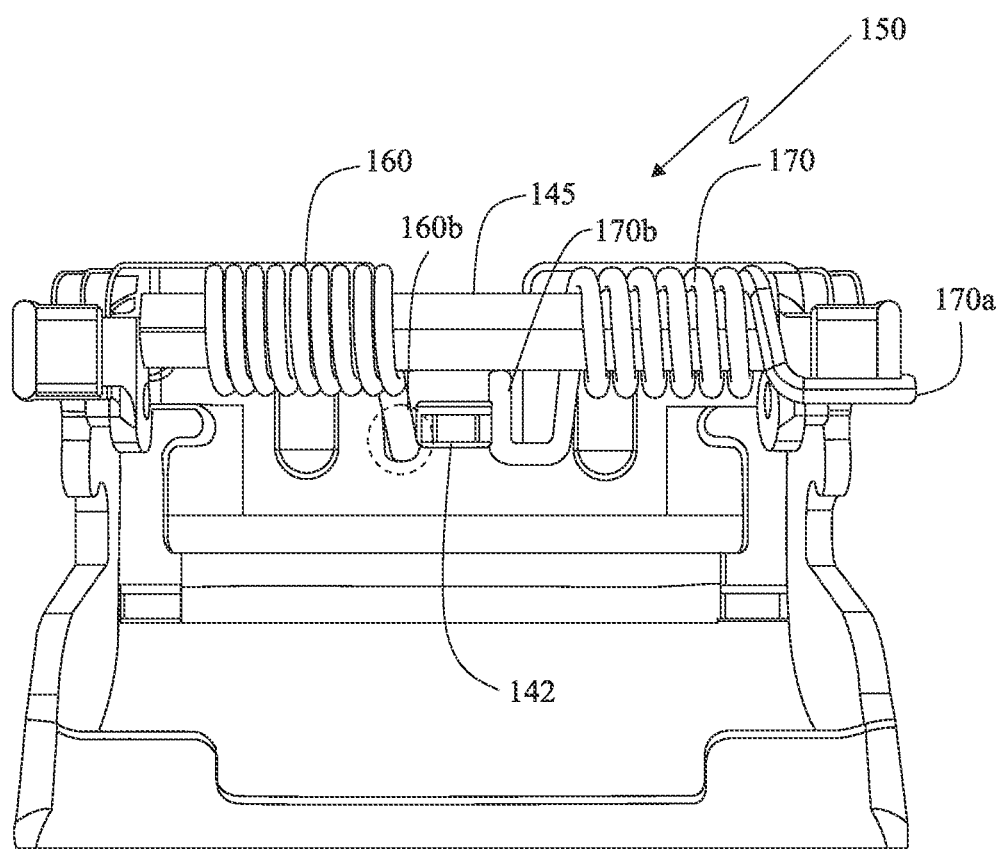
FIG. 5 illustrates another exemplary view of the hinge assembly when the first biasing member is in contact with the second hinge plate.
Figure 6:
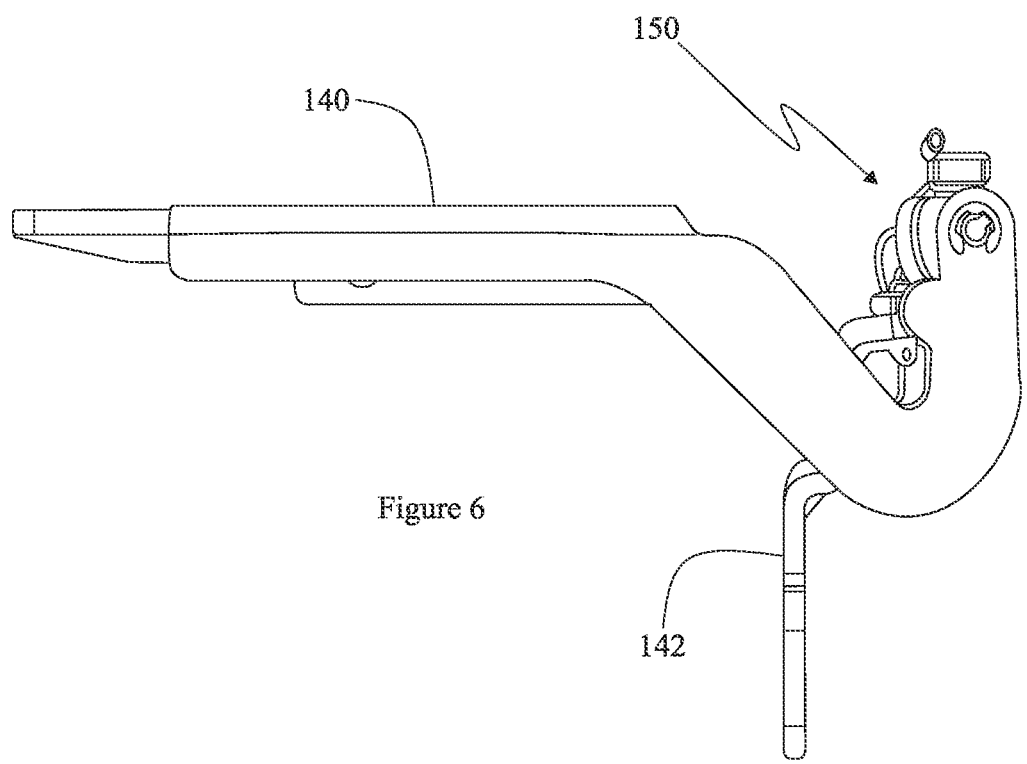
FIG. 6 illustrates a side view of the lid of FIGS. 2 and 3.

One end (160a) of the first biasing member (160) is connected to the first hinge plate (140), and the other end (160b) of the first biasing member (160) is adapted to connect with the second hinge plate (142). The first biasing member (160) may be designed in such a way that the second end (160b) of the first biasing member (160) contacts the second hinge plate/fixed plate (142) only after opening the lid (130) to an angle of 70° as shown in FIG. 5. Similarly, one end (170a) of the second biasing member (170) is connected to the first hinge plate (140) and other end (170b) of the second biasing member (170) is adapted to connect with the second hinge plate (142). The resting ends of the first biasing member (160) and the second biasing member (170) may be covered with TPE (NVH) material to avoid noise coming from movement with fixed second plate.

Therefore, an advantage of the disclosed safety arrangement inside a vehicle interior is that it allows a side airbag deployment without getting hindered by a lid of the centre console. The arrangement prevents injury to an occupant if his/her hand or finger gets trapped in between floor console and the lid. The safety arrangement is simple and is robust in construction.

Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments, other and further embodiments may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

The invention claimed is:

1. A safety arrangement for a vehicle interior, the safety arrangement comprising:
   an airbag arranged in or on one or more seats and configured to be deployed in the vehicle interior in case of an impact,
   a console box arranged adjacent or beside the one or more seats, the console box including a storage compartment for storing articles and a lid for closing and opening the storage compartment, wherein the lid is coupled to the console box, the lid being moveable between a fully open position and a closed position, wherein the closed position closes the storage compartment,
   wherein the lid is coupled to the console box by a hinge assembly, wherein the hinge assembly facilitates movement of the lid between the fully open position and the closed position, and
   wherein the hinge assembly biases the lid in a first position to prevent the lid from overlapping a deployment path of the airbag.

2. The safety arrangement as claimed in claim 1, wherein the first position is an intermediate position between the fully open position and the closed position or is the closed position.

3. The safety arrangement as claimed in claim 1, wherein the hinge assembly includes:
   a first biasing member adapted for biasing the lid in a direction towards the closed position; and
   a second biasing member adapted for biasing the lid in a direction towards the fully open position, wherein a relationship between biasing forces of the first biasing member and the second biasing member biases the lid to the first position to prevent overlapping of the lid with the deployment path of the airbag.

4. The safety arrangement as claimed in claim 3, wherein the first biasing member and the second biasing member are coil springs.

5. The safety arrangement as claimed in claim 3, wherein the stiffness of the second biasing member is less than the stiffness of the first biasing member.

6. The safety arrangement as claimed in claim 1, wherein the lid is adapted to latch with the console box in the closed position.

7. The safety arrangement as claimed in claim 1, wherein the first position is an intermediate position that is a partially open position with less than 15 degrees of an opening angle of the lid with respect to the closed position of the lid.

8. The safety arrangement as claimed in claim 1, wherein the first position is the closed position, wherein the lid is latched with the console box.

9. The safety arrangement as claimed in claim 1, wherein the first position is the closed position, wherein the lid is unlatched with the console box.

10. The safety arrangement as claimed in claim 1, wherein a knob is arranged on or in the console box or lid for latching and unlatching the lid with and from the console box.

11. The safety arrangement as claimed in claim 1, wherein the airbag is deployed in a transverse and/or longitudinal direction of the vehicle interior.

12. The safety arrangement as claimed in claim 5, wherein the first biasing member and the second biasing member are coil springs each comprising a spring material and having a diameter, length, and number of coils, and wherein the relative stiffness of the coils are determined based on a difference between the coils in at least one of the diameter, length, number of coils, and spring material of the coils.

13. The safety arrangement as claimed in claim 6, wherein the lid is adapted to latch with the console box latch by a hook-slot system.

14. The safety arrangement as claimed in claim 8, wherein a knob is arranged on or in the console box or lid for latching and unlatching the lid with and from the console box.

15. A safety arrangement for a vehicle interior, the safety arrangement comprising:
one or more seats with an airbag configured to be deployed from a side portion of the vehicle seat into the vehicle interior in case of an impact,
a console box arranged adjacent or beside the one or more seats, the console box including a storage compartment for storing articles and a lid for closing and opening the storage compartment, wherein the lid is coupled to the console box, the lid being moveable between a fully open position and a closed position, wherein the closed position closes the storage compartment,
wherein the lid is coupled to the console box by a hinge assembly, wherein the hinge assembly facilitates movement of the lid between the fully open position and the closed position,
wherein the hinge assembly biases the lid in a first position to prevent the lid from overlapping a deployment path of the airbag, and
wherein the hinge assembly includes:
a first biasing member adapted for biasing the lid in a direction towards the closed position; and
a second biasing member adapted for biasing the lid in a direction towards the fully open position, wherein a relationship between biasing forces of the first biasing member and the second biasing member biases the lid to a first position to prevent overlapping of the lid with the deployment path of the airbag.

16. The safety arrangement as claimed in claim 15, wherein the first biasing member and the second biasing member are coil springs.

17. The safety arrangement as claimed in claim 15, wherein the stiffness of the second biasing member is less than the stiffness of the first biasing member.

18. The safety arrangement as claimed in claim 16, wherein the first biasing member and the second biasing members each comprise a spring material and have a diameter, length, and number of coils, wherein the relative stiffness of the coils is determined based on a difference between the coils in at least one of the diameters, length, number of coils, and spring material of the coils.

19. The safety arrangement as claimed in claim 15, wherein the lid is adapted to latch with the console box in the closed position.

20. The safety arrangement as claimed in claim 19, wherein the lid is latched with the console box by a hook-slot system.

* * * * *